US012756741B2

(12) United States Patent
Das et al.

(10) Patent No.: US 12,756,741 B2
(45) Date of Patent: Oct. 6, 2026

(54) SYSTEM AND METHOD TO DYNAMICALLY EVALUATE FEEDBACK DATA

(71) Applicant: Bank of America Corporation, Charlotte, NC (US)

(72) Inventors: Debdatta Das, Plano, TX (US); Sohail Lalani, Stevenson Ranch, CA (US); Tony Lee Thurmond, Highland Village, TX (US); James V Biggerstaff, Richardson, TX (US); Tamara McCoury, The Colony, TX (US); David Alden Chervenak, Newton Centre, MA (US); Remya Durairasu, Prosper, TX (US)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 18/817,504

(22) Filed: Aug. 28, 2024

(65) Prior Publication Data

US 2026/0067330 A1 Mar. 5, 2026

(51) Int. Cl.
*H04L 9/40* (2022.01)
*H04L 67/306* (2022.01)

(52) U.S. Cl.
CPC ........ *H04L 63/1483* (2013.01); *H04L 67/306* (2013.01)

(58) Field of Classification Search
CPC .......................... H04L 63/1483; H04L 67/306
See application file for complete search history.

(56) References Cited

U.S. PATENT DOCUMENTS

| | | | |
|---|---|---|---|
| 7,917,749 | B2 | 3/2011 | Ginter et al. |
| 8,055,913 | B2 | 11/2011 | Ginter et al. |
| 8,566,115 | B2 | 10/2013 | Moore |
| 8,887,286 | B2 | 11/2014 | Dupont et al. |
| 9,450,971 | B2 | 9/2016 | Turgeman et al. |
| 9,552,470 | B2 | 1/2017 | Turgeman et al. |
| 10,055,560 | B2 | 8/2018 | Turgeman |

(Continued)

OTHER PUBLICATIONS

Talburt et al., (Chapter 14 Evaluating and Improving Data Fusion Accuracy, 2019, pp. 295-326) (Year: 2019).*

(Continued)

*Primary Examiner* — Oleg Korsak

(57) ABSTRACT

A system comprises a memory communicatively coupled to at least one processor. The at least one processor is configured to receive a communication operation associated with an entity and execute a machine learning algorithm to determine feedback data in the communication operation, determine categorization formats associated with multiple datapoints in the feedback data, assign a specific weighted value to each datapoint based on respective categorization formats, compare the datapoints to the reference datapoints; determine whether the datapoints at least partially matches the reference datapoints, determine multiple weighted values for each of the datapoints that match the reference datapoints, aggregate the weighted values into a match value; determine whether the match value is less than a value threshold, and determine that the entity is associated with the one or more user profiles in response to determining that the match value is less than the value threshold.

20 Claims, 3 Drawing Sheets

(56) References Cited

U.S. PATENT DOCUMENTS

| | | | |
|---|---|---|---|
| 10,692,054 B2 | 6/2020 | Chow et al. | |
| 10,872,333 B2 | 12/2020 | Dua | |
| 2018/0284756 A1 | 10/2018 | Cella et al. | |
| 2019/0303371 A1* | 10/2019 | Rowe | G06F 16/24564 |
| 2021/0312458 A1* | 10/2021 | Cai | G06Q 40/02 |
| 2024/0169152 A1* | 5/2024 | Yannam | G06F 40/284 |
| 2024/0169993 A1* | 5/2024 | Yannam | G06F 40/35 |
| 2024/0311393 A1* | 9/2024 | Marker | G06F 16/273 |
| 2025/0021424 A1* | 1/2025 | Uniyal | G06F 11/2273 |

OTHER PUBLICATIONS

The Mathematics of the Fellegi Sunter Model, Article, May 21, 2021, https://www.robinlinacre.com/maths_of_fellegi_sunter, pp. 1-4.

Akshita Sharma, 8 Practical Applications of AI Text Summarization, Blog, Mar. 1, 2024, https://www.godotmedia.com/blog/8-practical-applications-of-ai-text-summarization-you-should-explore, pp. 1-6.

Daniela Beltrami et al., Speech Analysis by Natural Language Processing Techniques: A Possible Tool for Very Early Detection of Cognitive Decline?, Article, Nov. 12, 2018, https://www.frontiersin.org/journals/aging-neuroscience/articles/10.3389/fnagi.2018.00369/full, pp. 1-38.

Oleksandr Bezrukov, How NLP Improves Multilingual Text-to-Speech & Voice Assistants [Practical Case Inside], Blog, May 5, 2023, https://tech-stack.com/blog/how-nlp-improves-multilingual-text-to-speech-voice-assistants, pp. 1-9.

Advantages and disadvantages of biometrics, Blog, Nov. 10, 2022, https://www.miteksystems.com/blog/advantages-and-disadvantages-of-biometrics, pp. 1-8.

Cameron Hashemi-Pour, Biometric Authentication, Guide, https://www.techtarget.com/searchsecurity/definition/biometric-authentication: Printed Aug. 22, 2024, pp. 1-7.

* cited by examiner

SYSTEM AND METHOD TO DYNAMICALLY EVALUATE FEEDBACK DATA

TECHNICAL FIELD

The present disclosure relates generally to providing security operations, and more specifically to a system and method to dynamically evaluate feedback data.

BACKGROUND

In certain communication systems, bad actors may attempt to gain access to network resources and/or sensitive data by providing falsified data that one or more verification devices in the communication systems may associate with one or more user profiles. These bad actors may attempt to gain access to the network resources and/or the sensitive data after bypassing security defenses. The falsified data may be confused with real data corresponding to users of one or more user profiles. The bad actors may present themselves to the communication systems by spoofing data and/or pretending to be associated with one or more user devices previously associated with user profiles trusted by the communication system. The communication systems may erroneously interpret the falsified data as belonging to one or more users associated with the one or more user profiles.

SUMMARY OF THE DISCLOSURE

In one or more embodiments, a system and method are configured to dynamically analyze biometric data. In particular, the system may be configured to execute one or more machine learning (ML) algorithms to evaluate the authenticity of feedback data received by one or more physical interfaces over a period of time. The system may be configured to match users with relevant user information without requesting specific authentication credentials from the users. In particular, the system recognizes and identifies entities interacting and/or attempting to access network resources during one or more interactions in a communication network. As communication operations performed in a communication network, the system is configured to determine feedback data based corresponding to one or more user interactions. The system may be configured to consolidate and summarize the feedback data received over time. The system may be configured to recognize and identify customers over bad actors by specific operations and/or access patterns performed by entities attempting to access the communication network. The feedback data may comprise biometric data, speech recognition, and/or image data among others. In some embodiments, the system may be configured to match a specific user profile with one or more datapoints in the feedback data. If the system cannot match any of the user profiles with the datapoints, the system may be configured to determine that the feedback data is associated with actions performed by a bad actor attempting to access network resources in the communication system.

In one or more embodiments, to verify whether the actions are performed by a trusted network device (e.g., a user device associated with one or more user profiles), the system may be configured to perform one or more probabilistic linkage operations to connect interactions where a same entity is attempting to access multiple accounts and/or network resources. Herein, the interactions may be matched to one or more user profiles by executing a machine learning (ML) algorithm to use a Fellegi-Sunter probabilistic model to find links using mathematical weights coupled to the feedback data comprising biometric data analysis to find suspicious operations. In some embodiments, the Fellegi-Sunter model evaluates one or more parameters in order to generate a match probability between two or more records. The system may be configured to determine and consider a probability of a given observation given one or more matching records and a probability of a given observation given one or more non-matching records.

In one or more embodiments, the system described herein are integrated into a practical application to improve security in a communication network by determining whether entities performing one or more actions in the communication network are associated with user devices or electronic attackers. In particular, the system may be configured to execute an ML algorithm to analyze feedback data received from the entities in the communication network and determine whether the feedback data comprises suspicious activity performed by the one or more entities. The system may be configured to implement a probabilistic model to assign weighted values to datapoints in the feedback data received, evaluate whether the datapoints in the received feedback data correspond to probabilistically determined suspicious activity, and determine whether the feedback matches the suspicious data. In some embodiments, the system may be configured to execute the ML algorithm to evaluate possible changes to feedback data associated with suspicious patterns and evolve the suspicious patterns to account for new suspicious activities thereby creating a growing and changing repository of suspicious patterns that may be compared with patterns determined in future received feedback data.

In one or more embodiments, the system is directed to technical improvements in computer systems. Specifically, the system reduces processor and memory usage in servers and/or user devices by identifying bad actors from legitimate users attempting to access network resources and/or sensitive data in a communication network. As entities are determined to be bad actors based on their actions in the network, the system is configured to filter these bad actors from accessing some or all network resources and/or sensitive information in the network. Herein, processing and memory usage is reduced because processing and memory resources are not made available to all entities attempting to access the network resources. Instead, the system filters out bad actors and the processing and memory resources are made accessible to entities determined to be legitimate users. Further, the system is configured to prevent resources from being wasted retrieving data and/or restoring sensitive information in the communication network. In this regard, the system inhibits tracking of possible adverse impacts that bad actors could have caused in the network were the bad actors to reach sensitive information and/or network resources. As a result, processing resources, memory resources, and/or power resources are not spent retroactively tracking the actions of bad actors in the communication network.

In one or more embodiments, the system may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured, when executed, to evaluate data in accordance with one or more machine learning models and reference interaction data comprising multiple reference datapoints indicating user information associated with one or more user profiles. The at least one processor may be configured to receive a communication operation associated with an entity and execute the machine learning algorithm to determine feedback data in the communication operation. The feedback data may comprise multiple datapoints that represents information provided by the entity. Further, the at least one processor may be configured to determine multiple categorization formats associated with the datapoints in response to determining the feedback data in the communication operation. Each categorization format may be associated with each datapoint. The at least one processor may be configured to assign a specific weighted value to each datapoint of the datapoints based on respective categorization formats, compare the datapoints to the reference datapoints; determine whether the datapoints at least partially matches the reference datapoints, determine multiple weighted values for each of the datapoints that match the reference datapoints, aggregate the weighted values into a match value; determine whether the match value is less than a value threshold, and determine that the entity is associated with the one or more user profiles in response to determining that the match value is less than the value threshold.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
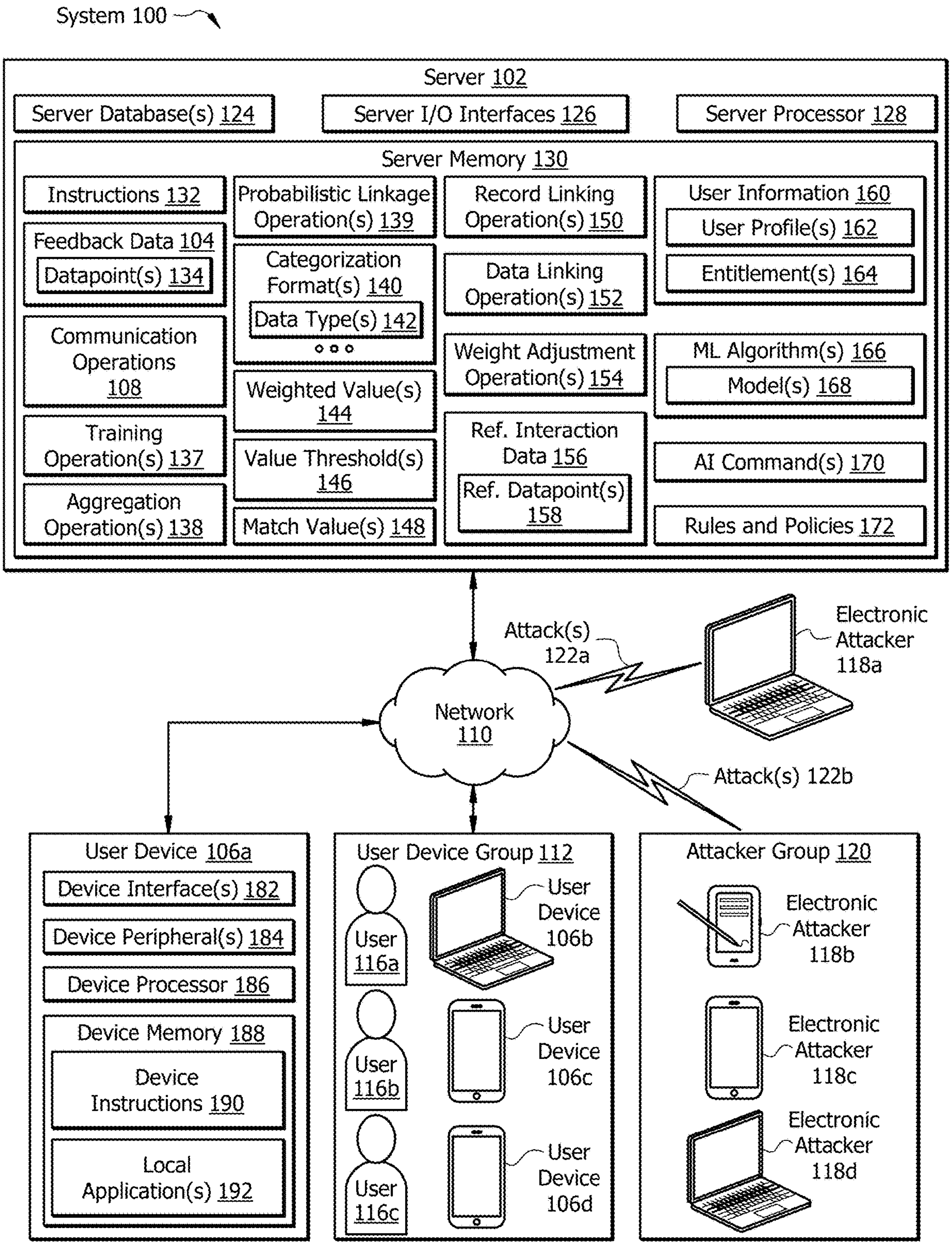
FIG. 1 illustrates a system in accordance with one or more embodiments.
Figure 2:
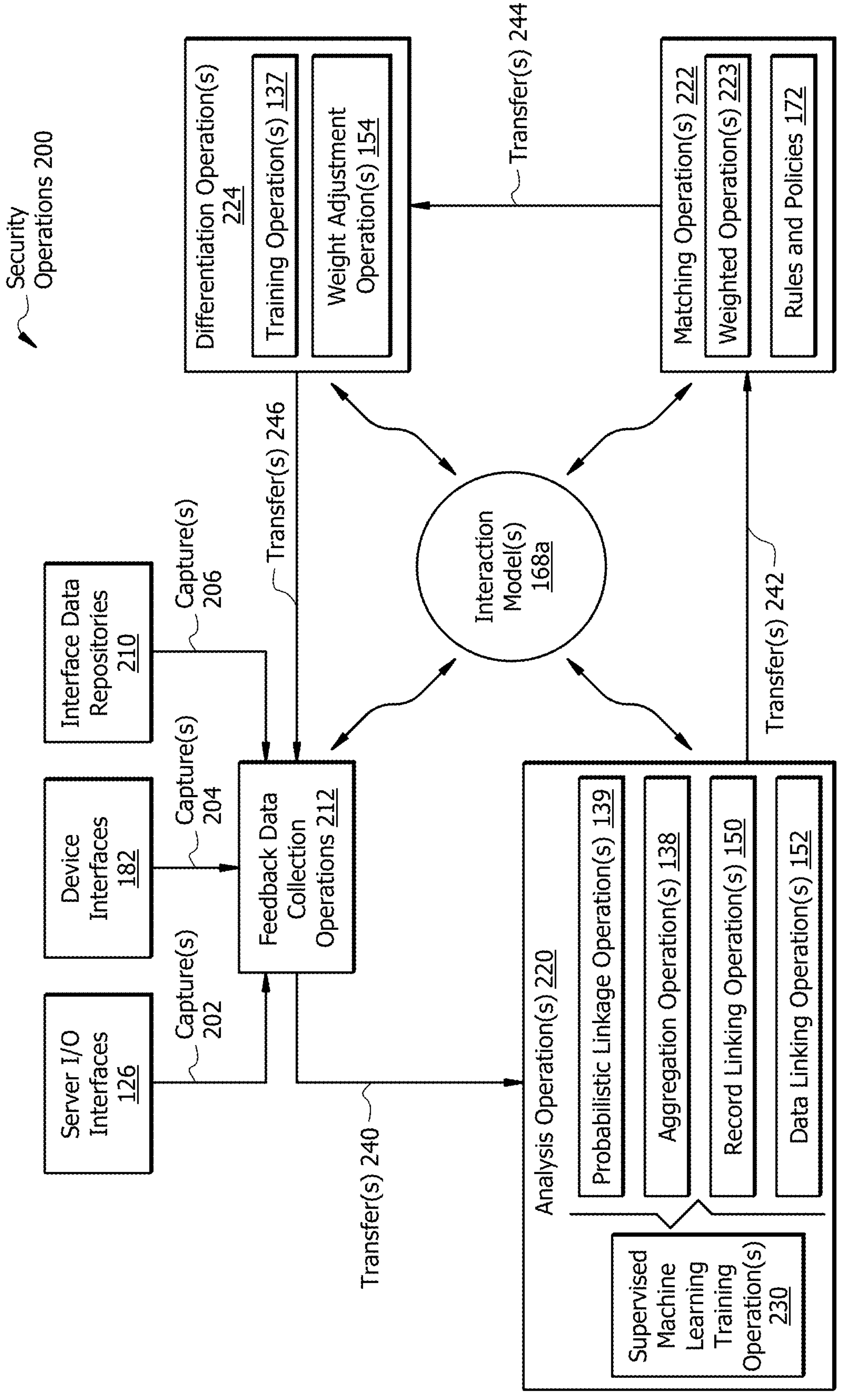
FIG. 2 illustrates multiple security operations performed by the system of FIG. 1 in accordance with one or more embodiments.
Figure 3:
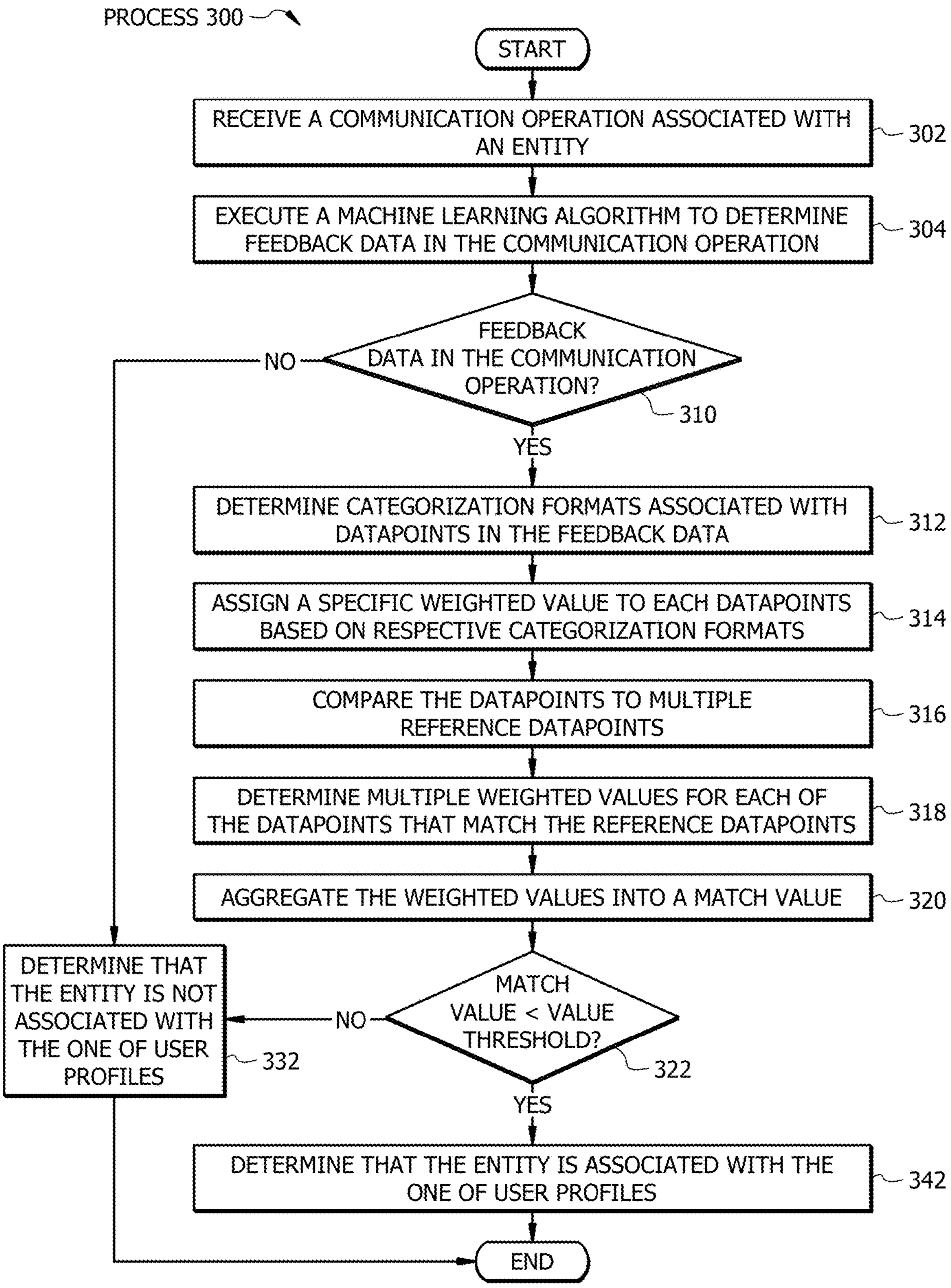
FIG. 3 illustrates an example flowchart of a method to perform the security operations of FIG. 2 in accordance with one or more embodiments.

As described above, this disclosure provides various systems and methods to dynamically analyze feedback data. FIG. 1 illustrates a system 100 in which a server 102 configured to analyze feedback data 104 received from a communication network. FIG. 2 illustrates multiple security operations 200 performed by the system 100 of FIG. 1. FIG. 3 illustrates a process 300 performed by the system 100 of FIG. 1.

System Overview

FIG. 1 illustrates an example system 100, in accordance with one or more embodiments. The system 100 may comprise a server 102 configured to configured to analyze feedback data 104 received from a communication network. The system 100 includes a server 102 communicatively coupled to a user device 106*a*, a user device 106*b*, a user device 106*c*, and a user device 106*d* (collectively, user devices 106) via a network 110. The user devices 106 may be user nodes configured to trigger exchanges of data and/or perform one or more communication operations 108 with the server 102 via the network 110. The user devices 106 may be working nodes configured to receive instructions to perform one or more communication operations 108 based on instructions received from the server 102. In some embodiments, some of the user devices 106 may be clustered together in one or more user device groups 112. Each of the user devices 106 may be associated with one or more corresponding operators. These operators are shown as a user 116*a*, a user 116*b*, and a user 116*c* (collectively, users 116) in the user device groups 112. In FIG. 1, the user device group 112 is shown comprising the user 116*a* associated with the user device 106*b*, the user 116*b* associated with the user device 106*c*, and the user 116*c* associated with the user device 106*d*.

In one or more embodiments, the example of FIG. 1 shows an electronic attacker 118*a*, an electronic attacker 118*b*, an electronic attacker 118*c*, and an electronic attacker 118*d* (collectively, electronic attackers 118). In some embodiments, some of the electronic attackers 118 may be clustered together in one or more attacker groups 120. In FIG. 1, the attacker group 120 is shown comprising the electronic attacker 118*b*, the electronic attacker 118*c*, and the electronic attacker 118*d*. These electronic attackers 118 may be bad actors attempting to perform one or more attacks 122 (e.g., attacks 122*a* and attacks 122*b*) to the server 102, the user devices 106, the network, and/or the user device groups 112.

In one or more embodiments, the server 102 may comprise one or more server databases 124, one or more server input (I)/output (O) interfaces 126, at least one server processor 128, and at least one server memory 130 communicatively coupled to one another. In some embodiments, the server memory 130 may comprise instructions 132, the feedback data 104 comprising one or more datapoints 134, the one or more communication operations 108, one or more training operations 137, one or more aggregation operations 138, one or more probabilistic linkage operations 139, one or more categorization formats 140 comprising one or more data types 142, one or more weighted values 144, one or more value thresholds 146, one or more match values 148, one or more record linking operations 150, one or more data linking operations 152, one or more weight adjustment operations 154, reference interaction data 156 comprising one or more reference datapoints 158, user information 160 comprising one or more user profiles 162 associated with one or more entitlements 164 to access one or more services (e.g., applications) in a communication network (e.g., the network 110), one or more machine learning (ML) algorithms 166 configured to train one or more models 168, one or more artificial intelligence (AI) commands 170, and one or more rules and policies 172.

Referring to the user device 106*a* a non-limiting example, the user device 106*a* may comprise one or more device interfaces 182, one or more device peripherals 184, at least one device processor 186, and at least one device memory 188 communicatively coupled to one another. The device memory 188 may comprise device instructions 190 and/or one or more local applications 192.

System Components

Server

The server 102 is generally any device or apparatus that is configured to process data and communicate with computing devices (e.g., the user devices 106), additional databases, systems, and the like, via the one or more server I/O interfaces 126 (i.e., a user interface or a network interface). The server 102 may comprise the server processor 128 that is generally configured to oversee operations of the processing engine. The operations of the processing engine are described further below in conjunction with the system 100 described in FIG. 1, the security operations 200 in FIG. 2, and the process 300 described in FIG. 3.

The server 102 comprises multiple server databases 124 configured to provide one or more memory resources to the server 102 and/or the user devices 106. The server 102 comprises the server processor 128 communicatively coupled with the server databases 124, the server I/O interfaces 126, and the server memory 130. The server 102 may be configured as shown, or in any other configuration. In one or more embodiments, the server databases 124 are configured to store data that enables the server 102 to configure, manage and coordinate one or more middleware systems. In some embodiments, the server databases 124 store data used by the server 102 to function as a halfway point in between one or more services and other tools or databases.

In one or more embodiments, the server I/O interfaces 126 may be configured to enable wired and/or wireless communications. The server I/O interfaces 126 may be configured to communicate data between the server 102 and other user devices (i.e., the user devices 106), network devices (i.e., routers in the network 110), systems, or domain(s) via the network 110. For example, the server I/O interfaces 126 may comprise a WI-FI interface, a LAN interface, a WAN interface, a modem, a switch, or a router. The server processor 128 may be configured to send and receive data using the server I/O interfaces 126. The server I/O interfaces 126 may be configured to use any suitable type of communication protocol. In some embodiments, the server I/O interfaces 126 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The server processor 128 comprises one or more processors communicatively coupled to the server memory 130. The server processor 128 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 128 may be a programmable logic device, a microcontroller, a microprocessor, or any suitable combination of the preceding. The one or more server processor 128 are configured to process data and may be implemented in hardware or software executed by hardware. For example, the server processor 128 may be 8-bit, 16-bit, 32-bit, 64-bit or of any other suitable architecture. The server processor 128 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processor 128 are configured to execute various instructions. For example, the one or more server processor 128 are configured to execute the instructions 132 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 126 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 126 may be configured to support any suitable type of communication protocol as would be appreciated by one of ordinary skill in the art. In one or more embodiments, the server I/O interfaces 126 may comprise one or more sensors configured to evaluate physical phenomena surrounding the server 102 and/or one or more of the user devices 106. The sensors may be proximity sensors, optical sensors, and the like.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the feedback data 104 comprising the one or more datapoints 134, the one or more communication operations 108, the one or more training operations 137, the one or more aggregation operations 138, the one or more probabilistic linkage operations 139, the one or more categorization formats 140 comprising one or more data types 142, the one or more weighted values 144, the one or more value thresholds 146, the one or more match values 148, the one or more record linking operations 150, the one or more data linking operations 152, the one or more weight adjustment operations 154, the reference interaction data 156 comprising the one or more reference datapoints 158, the user information 160 comprising the one or more user profiles 162 associated with the one or more entitlements 164 to access the one or more services (e.g., applications) in the communication network (e.g., the network 110), the one or more ML algorithms 166 configured to train the one or more models 168, the one or more AI commands 170, and the one or more rules and policies 172. The instructions 132 may comprise any suitable set of instructions, logic, rules, or code operable to execute the server processor 128.

The one or more communication operations 108 may be one or more data exchanges performed between two or more network devices in the system 100. The network devices may comprise the server 102 and one or more of the user devices 106 among others. In one or more embodiments, the communication operations 108 may be audio communications exchanged as part of audio conversations (e.g., during a telephonic call) between two or more network devices. The communication operations 108 may be image and/or text communications exchanged as part of image-based conversations (e.g., during videocalls and/or chat exchanges) between two or more network devices.

The feedback data 104 may comprise information associated with one or more of the communication operations 108, information associated with one or more entities, and one or more tracked activities associated with the entities. The feedback data 104 may comprise information provided by and/or obtained from the entities during one or more communication operations 108 in the network 110. The server 102 may be configured to perform one or more retrieving operations configured to determine feedback data 104 in the tracked activities from the communication operations 108 and generate one or more reports associated with interactions of the entities in the network 110. The feedback data 104 may be collected continuously without interruptions and/or periodically over time and/or periods of time. The feedback data 104 may comprise one or more datapoints 134 referencing one or more physical phenomena and/or aspects of a portion of one or more users 116. The feedback data 104 may be obtained via one or more ML models 168 configured with a natural language processing (NPL) that identifies conversations associated with one or more of the users 116. The feedback data 104 may be captured via the one or more server I/O interfaces 126 and/or the one or more device interfaces 182. The feedback data 104 may comprise multiple sound, text, and/or action data samples. Each data sample may comprise a magnitude and a duration. The feedback data 104 may be configured to reference one or more attempted actions associated with the communication operations 108.

The feedback data 104 may indicate one or more changes in the behavior associated with one or more of the entities. In one or more embodiments, the datapoints 134 are information data representative on one or more aspects of the communication operations 108 performed and/or triggered by the one or more entities in the network 110. The datapoints 134 may be data that represents extracted information and/or summarized information of the feedback data 104 associated with one or more operations attempted and/or performed by the entities. In the example of FIG. 1, the datapoints 134 may be business metadata used by one of the applications and may be dynamic in nature. The datapoints 134 may be individual aspects of the feedback data 104. For example, in feedback data 104 comprising an image of a portion of an iris scan, the datapoints 134 may be individual pixels of the image comprising one or more data categorization formats 140 and one or more data types 142.

The value thresholds 146 may be one or more specific numbers and/or number ranges associated with a specific parameter and/or indicator. The value thresholds 146 may be a specific value representing a higher boundary or a lower boundary. The value thresholds 146 may be one or more threshold ranges comprising higher boundaries and lower boundaries. The value thresholds 146 may be a percentage value representing a similarity and/or a difference between one or more values assigned as tolerances for current match values 148 determined weight and/or one or more match values 148. The value thresholds 146 may be determined based on information associated with the communication operations 108. The value thresholds 146 may be determined dynamically over time. The value thresholds 146 may be predefined and/or predetermined in accordance with information in activity associated with one or more of the communication operations 108. In some embodiments, the server 102 may be configured to calculate the value thresholds 146 based on information obtained via the server I/O interfaces 126 and/or device interfaces 182.

The one or more communication operations 108 may be one or more operations executed by the server processor 128 configured to enable data objects to be exchanged between the user devices 106 and/or the server 102. In one or more embodiments, the communication operations 108 may be configured to indicate one or more data objects to be exchanged between the server 102 and at least one of the user devices 106. The server 102 may be configured to generate and analyze one or more communication operations 108 to confirm whether one or more entities associated with communication operations 108 are legitimately associated with at least one of the user devices 106. The server 102 may be configured to perform one or more operations in which the server 102 is configured to confirm whether one or more communication operations 108 belong to a specific user device 106.

The one or more categorization formats 140 may be one or more representations of the feedback data 104 and/or the datapoints 134. The one or more categorization formats 140 may comprise one or more representations and/or mapping layouts. The categorization formats 140 may be one or more aspects of the feedback data 104 and/or the datapoints 134. The categorization formats 140 may be one or more image formats of an image and/or alphanumeric format associated with a data file. The one or more categorization formats 140 may be evaluated and/or analyzed over time. The categorization formats 140 may be configured to indicate one or more data types 142 associated with one or more datapoints 134 of the feedback data 104. The data types 142 may indicate a source corresponding to a specific feedback data 104. The data types 142 may comprise one or more data identifiers associated for each datapoint 134. The data types 142 may be information specific for each datapoint 134. For example, a datapoint 134*a* in feedback data 104 may comprise an image may be color information indicating a hue associated with a portion of the image. The data types 142 may be color information, density information, or size information among others. Each of the categorization formats 140 may be associated with one or more of the data types 142.

In one or more embodiments, the one or more training operations 137 comprise one or more operations executed in conjunction with the one or more operations of the ML algorithms 166. The one or more training operations 137 may be configured to structure and analyze the feedback data 104, the categorization formats 140 associated with the datapoints 134 in the feedback data 104, historical activity data in the form of the reference interaction data 156, the user information 160, the rules and policies 172, and/or one or more analysis results from the aggregation operations 138, the probabilistic linkage operations, the record linking operations 150, the data linking operations 152, and/or the weight adjustment operations 154. The training operations 137 may be configured to use some or all of the aforementioned data as input parameters to update, regulate, and/or modify the ML algorithm 166 and/or the one or more models 168. The one or more analysis results may be one or more results of one or more analyses performed by the server processor 128. The analyses may be performed as part of one or more operations triggered after executing the one or more instructions 132 (e.g., comprising executing the ML algorithm 166). The analysis results may be structured data comprising information in the form of lists, tables, and/or databases among others.

In one or more embodiments, the one or more aggregation operations 138 comprise one or more operations executed in conjunction with the one or more operations of the ML algorithms 166. The one or more aggregation operations 138 may be configured to add one or more weighted values 144 and/or match values 148 at any point in time. The aggregation operations 138 may be configured to combine and/or organize some information associated the operations described in reference to FIGS. 1-3.

The probabilistic linkage operations 139 may comprise correlating and combining user information 160 comprising alphanumeric identifiers (IDs), speech patterns, biometric data (e.g., iris registry, facial images, and like), and one or more activity and/or interaction patterns of entities associated with specific user profiles. In one or more embodiments, the probabilistic linkage operations 139 may comprise matching interactions in the communication network to one or more user profiles by executing the ML algorithm 166 to use a Fellegi-Sunter probabilistic model to find links using mathematical weights coupled to the feedback data comprising biometric data analysis to find suspicious operations. In some embodiments, the Fellegi-Sunter model may be one or more of the models 168 configured to evaluate one or more datapoints 134 in the feedback data 104 in order to generate a match probability between two or more records (e.g., the one or more reference interaction data 156 comprising the one or more reference datapoints 158). The probabilistic linkage operations 139 may be configured to determine and consider a probability of a given observation (e.g., an identified operation and/or interaction matching patterns of another entity in the system 100) given one or more matching records and a probability of a given observation given one or more non-matching records.

The record linking operations 150 may be one or more operations configured to evaluate and/or analyze information associated with one or more operations of the entities accessing the network 110. The record linking operations 150 may be stored in one or more data formats. The server 102 may be configured to generate one or more access commands based on feedback data 104. In this regard, the record linking operations 150 may be operations configured to indicate modifications and/or assignments of one or more network resources in the network 110. The record linking operations 150 may comprise results of one or more operations of the processing engine configured to perform as operations that retrieve and analyze the feedback data 104. The record linking operations 150 may be configured to establish one or more communication links configured to enable access between a user device 106 determined to perform one or more legitimate communication operations 108. The record linking operations 150 may be one or more of the operations described in the security operations 200 in FIG. 2.

In some embodiments, the weighted values 144 may be one or more alphanumeric values assigned to one or more of the datapoints 134 based on one or more corresponding categorization formats 140 at any point in time. The weighted values 144 may be assigned to one or more categorization formats 136 associated with each datapoints 134. For example, feedback data 104 comprising an image of a face of an entity attempting to access network resources. In this example, the datapoints 134 may be one or more three-dimensional polygons representing portions of a face in the image. Herein, after executing the ML algorithm 166, the server 102 may be configured to determine categorization formats 140 for the datapoints 134 based on their location in the image, light exposure, and the like. The server 102 may be configured to assign weighted values 144 to each datapoint 134 and/or each categorization formats 136.

In some embodiments, the match values 148 may be one or more alphanumeric values representative of datapoints 134 that match reference datapoints 158 during one or more record linking operations 150 and/or one or more data linking operations 152. In some embodiments, the server 102 may be configured to aggregate the one or more weighted values 144 before or after the one or more weight adjustment operations 154 are performed. Herein, the match values 148 may be one or more values representing a number of times in which the server 102 matches one or more of the datapoints 134 to the one or more reference datapoints 158. The aggregation operations 138 may be configured to add up a number of times in which matches are found and determine whether the match value 148 is less than, greater than, and/or equal to one or more of the value thresholds 146. In other embodiments, the match values 148 may be one or more alphanumeric values representative of datapoints 134 that mismatch reference datapoints 158 during one or more record linking operations 150 and/or one or more data linking operations 152. In some embodiments, the server 102 may be configured to aggregate the one or more weighted values 144 before or after the one or more weight adjustment operations 154 are performed. Herein, the match values 148 may be one or more values representing a number of times in which the server 102 does not match one or more of the datapoints 134 to the one or more reference datapoints 158. The aggregation operations 138 may be configured to add up a number of times in which mismatches are found and determine whether the match value 148 is less than, greater than, and/or equal to one or more of the value thresholds 146. The In one or more embodiments, the one or more data linking operations 152 comprise one or more operations executed in conjunction with the one or more operations of the ML algorithms 166. The one or more data linking operations 152 may be configured to show one or more patterns comprising one or more intents to perform a specific communication operation 108. The data linking operations 152 may be configured to represent one or more action items performed to at least partially fulfill one or more target operations associated with the feedback data 104 and/or the communication operations 108. In some embodiments, the data linking operations 152 may show intents of actions to be performed to meet one or more target commands at least partially. The data linking operations 152 may be mapped to one or more existing communication operations 108. The data linking operations 152 may show predicted future behaviors that one or more of the entities are expected to perform in the communication network. In some embodiments, the data linking operations 152 may be one or more assumed actions associated with the communication operations 108.

In some embodiments, each of the data linking operations 152 may connect and/or release the datapoints 134 in sequence to represent an intent and/or a pattern. The data linking operations 152 may be representative of an appearance of the datapoints 134 in specific locations within the feedback data 104. For example, for feedback data 104 comprising a portion of an image of an eye (e.g., obtained from an iris scan), one or more data linking operations 152 may comprise lines shaping the eye and/or portions of the eye. In this regard, the data linking operations 152 may reference and/or show connectivity between one or more pixels in the image of the eye. The data linking operations 152 may be generated, created, evaluated, and/or analyzed in real-time. The data linking operations 152 may comprise multiple portions and/or sections. These portions and/or sections may be evaluated and/or analyzed individually and/or in clusters (e.g., groups).

The one or more reference interaction data 156 may be historic information associated with one or more communication devices in a communication network comprising several communication sites. The reference interaction data 156 may comprise one or more reference datapoints 158 representing one or more trends associated with power consumption for a specific user device 106, a group of user devices 106, and/or several user devices 106 associated with one or more user profiles 162 in the communication network. The reference interaction data 156 may be feedback data 104 that is previously processed and determined to match user information 160 associated with one or more user profiles 162. The reference datapoints 158 may be one or more datapoints 134 that are previously processed and determined to match user information 160 associated with one or more user profiles 162.

In one or more embodiments, the one or more weight adjustment operations 154 comprise one or more operations executed in conjunction with the one or more operations of the ML algorithms 166. The one or more weight adjustment operations 154 may be configured to adjust the one or more weighted values 144 based on one or more changes to the data linking operations 152. The weighted values 144 may indicate an importance level associated with the one or more datapoints 134 based on corresponding categorization formats 140. The weight adjustment operations 154 may comprise one or more changes and/or modifications to the weighted values 144.

In one or more embodiments, the training operations 137, the aggregation operations 138, the probabilistic linkage operations, the record linking operations 152, the data linking operations 152, and/or the weight adjustment operations 154 may be replaced, updated, and/or modified dynamically. Further, the training operations 137, the aggregation operations 138, the probabilistic linkage operations, the record linking operations 152, the data linking operations 152, and/or the weight adjustment operations 154 may be replaced, updated, and/or modified periodically. In some embodiments, the one or more models 168 may be configured trained to guide performance of the training operations 137, the aggregation operations 138, the probabilistic linkage operations, the record linking operations 152, the data linking operations 152 and/or the weight adjustment operations 154 upon executing one or more of the ML algorithms 166.

In some embodiments, one or more denylists may comprise alerts generated to one or more entities in the communication network. In this regard, the denylists may associate callers to the one or more user profiles 162 with fraudulent remarks if an entity is identified to be a bad actor (e.g., one or the electronic attackers 118). The alerts may be warnings generated for the entities in the form of feedback (e.g., notifications, tactile feedback, and/or visual feedback among others). The denylists may be lists comprising online information related to one or more identified electronic attackers 118, spam callers, and otherwise blocked callers. The server 102 may reference the denylists to inform one or more of the user devices 106 that a communication request should not be received. The server 102 may be configured to update the denylists with new information collected from one or more of the electronic attackers 118.

The user information 160 may comprise the one or more user profiles 162, one or more entitlements 164, and one or more services. In one or more embodiments, the user profiles 162 may comprise multiple profiles associated with one or more entitlements 164 to access and/or modify the services. Each of the user profiles 162 may be associated with one or more entitlements 164. The entitlements 164 may indicate that a given user device 106 is allowed to access one or more network resources in accordance with the one or more rules and policies 172. The entitlements 164 may indicate that a given user device 106 is allowed to perform one or more operations in the system 100 (e.g., provide a specific application data access to one of the users 116). To secure or protect operations of the user devices 106 from bad actors, the entitlements 164 may be assigned to a given user profile 162 in accordance with updated security information, which may provide guidance parameters to the use of the entitlements 164 based at least upon corresponding rules and policies 172. In one or more embodiments, the one or more services perform one or more application operations using one or more access commands. In some embodiments, the user profiles 162 may comprise multiple profiles for the users 116. Each user profile 162 may comprise one or more entitlements 164. As described above, the entitlements 164 may indicate that a given user 116 is allowed to access one or more network resources in accordance with one or more rules and policies 172. The entitlements 164 may indicate that a given user 116 is allowed to perform one or more data exchanges with the server 102 via the network 110. In one or more embodiments, each of the user profiles 162 may comprise information about at least one user 116 entitled to trigger one or more communication operations 108.

In one or more embodiments, the ML algorithms 166 may be executed by the server processor 128 to evaluate the communication operations 108 and/or the feedback data 104. Further, the ML algorithms 166 may be configured to interpret and transform one or more request for access to network resources, the one or more communication operations 108, the feedback data 104, and/or the instructions 132 into structured data sets and subsequently stored as files or tables. The ML algorithms 166 may cleanse, normalize raw data, and derive intermediate data to generate uniform data in terms of encoding, format, and data types. The ML algorithms 166 may be executed to run user queries and advanced analytical tools on the structured data and/or the unstructured data in accordance with one or more ML models 168. The ML algorithms 166 may be configured to generate the one or more AI commands 170 based on one or more results of the training operations 137, the aggregation operations 138, the probabilistic linkage operations 139, the record linking operations 150, the data linking operations 152, and the weight adjustment operations 154. The AI commands 170 may be parameters that proactively trigger one or more of the training operations 137, the aggregation operations 138, the probabilistic linkage operations 139, the record linking operations 150, the data linking operations 152, and the weight adjustment operations 154. The AI commands 170 may be combined with the existing instructions 132 to dynamically trigger and/or perform the training operations 137, the aggregation operations 138, the probabilistic linkage operations 139, the record linking operations 150, the data linking operations 152, the weight adjustment operations 154, and/or some or all of the communication operations 108. The AI commands 170 may be configured to trigger one or more cognitive AI operations in accordance with one or more ML models 168. The ML models 168 may be trained by the one or more ML algorithms 166 based on historic information associated with any training operations 137, aggregation operations 138, probabilistic linkage operations 139, record linking operations 150, data linking operations 152, and/or weight adjustment operations 154 performed with the server 102.

The rules and policies 172 may be security configuration commands or regulatory operations predefined by an organization or one or more users 116. In one or more embodiments, the rules and policies 172 may be dynamically defined by the one or more users 116. The rules and policies 172 may be prioritization rules configured to instruct one or more user devices 106 to perform one or more evaluating operations or perform one or more operations in the system 100 in a specific communication operation 108. The one or more rules and policies 172 may be predetermined or dynamically assigned by a corresponding user 116 or an organization associated with the users 116.

In one or more embodiments, the server databases 124 may be one or more repositories configured to store information. In one example, the server 102 may determine the server processor 128 is available (e.g., running) to perform a specific service. In another example, the server 102 may determine that a specific managed server is running to enable a testing application and/or perform the specific service upon receiving a server response indicating that a corresponding managed server is available to perform the service. The server databases 124 may be configured to store one or more representations of data instead of storing coded data. In this regard, the representations may be encoded in accordance with an encoder configured to identify and/or verify exchanged information. For example, the server databases 124 may comprise one or more representations of the feedback data 104. As the feedback data 104 is obtained, the server processor 128 may be configured to process the feedback data 104 in accordance with the one or more aforementioned operations.

User Device

In one or more embodiments, each of the user devices 106 (e.g., the user device 106*a*, the user devices 106*b*-106*d* in the user device group 112) may be any computing device configured to communicate with other devices, such as the server 102, other user devices 106 in the user device group 112, databases, and the like in the system 100. Each of the user devices 106 may be configured to perform specific functions described herein and interact with the server 102 and/or any other user devices 106. Examples of the user devices 106 comprise, but are not limited to, a laptop, a computer, a smartphone, a tablet, a smart device, an IoT device, a simulated reality device, an augmented reality device, or any other suitable type of device. The requests may be provided by the user devices 106 via one or more interfaces comprising input displays, voice microphones, or sensors capturing gestures performed by a corresponding user 116.

The user devices 106 may be hardware configured to create, transmit, and/or receive information. The user devices 106 may be configured as a provider node or as worker nodes. The user devices 106 may be configured to receive inputs from a user, process the inputs, and generate data information or command information in response. The data information may include documents or files generated using a graphical user interface (GUI).

Referring to the user device 106*a* as a non-limiting example, the command information may include input selections/commands triggered by a user using a peripheral component or one or more device peripherals 184 (i.e., a keyboard) or an integrated input system (i.e., a touchscreen displaying the GUI). The user devices 106 may be communicatively coupled to the server 102 via a network connection (i.e., the device peripherals 184). The user devices 106 may transmit and receive data information, command information, or a combination of both to and from the server 102 via the device interfaces 182. In one or more embodiments, the user devices 106 are configured to exchange data, commands, and signaling with the server 102. In some embodiments, the user devices 106 are configured to receive at least one security system configuration from the server 102 to implement a security system (one of the one or more local applications 192) at one of the user devices 106.

In one or more embodiments, the device interfaces 182 may be any suitable hardware or software (e.g., executed by hardware) to facilitate any suitable type of communication in wireless or wired connections. These connections may comprise, but not be limited to, all or a portion of network connections coupled to additional user devices 106, the server 102, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the user devices 106. For example, the one or more device peripherals 184 may be speakers configured to release audio signals (e.g., voice signals or commands) during media playback operations. In another example, the one or more device peripherals 184 may be microphones configured to capture audio signals. In one or more embodiments, the one or more device peripherals 184 may be configured to operate continuously, at predetermined time periods or intervals, or on-demand.

The device processor 186 may comprise one or more processors communicatively coupled to and in signal communication with the device interfaces 182, the device peripherals 184, and the device memory 188. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 may comprise an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions.

The device memory 188 may comprise multiple operation data and one or more local applications 192 associated with the server 102. The operation data may be data configured to enable one or more data processing operations such as those described in relation with the server 102. The operation data may be partially or completely different from those comprised in the server memory 130. The local applications 192 may be one or more of the services described in relation with the server 102. In some embodiments, the local applications 192 may be partially or completely different from those comprised in the server memory 130.

Network

The network 110 facilitates communication between and amongst the various devices of the system 100. The network 110 may be any suitable network operable to facilitate communication between the server 102 and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Electronic Attacker

In one or more embodiments, electronic attackers 118 may be any electronic device that influences the operations of one or more devices in the network 110. In some embodiments, the electronic attacker group 120 comprises multiple devices configured to interfere with operations of devices in the network 110. The attacker group 120 comprises the electronic attacker 118*b*, the electronic attacker 118*c*, and the electronic attacker 118*d*. Each of the electronic attackers may perform one or more attacks 122 (e.g., attacks 122*a* and attacks 122*b*). The attacks 122 (e.g., one or more electronic attacks) may be one or more unexpected operations triggered by the electronic attackers 118 in the network 110. In some embodiments, a single electronic attacker 118 may perform one or more attacks 122*a*. In other embodiments, multiple electronic attackers 118 (e.g., the attacker 118*b*, the attacker 118*b*, and the attacker 118*d* in the attacker group 120) may perform one or more attacks 122*b*.

Referring as a non-limiting example to the electronic attacker 118*a* of FIG. 1, the electronic attacker 118*a* may be hardware and/or software, executed by hardware, which launches the attacks 122*a* to affect the operations performed by the server 102 and/or the user devices 106. Although not explicitly shown in FIG. 1, the electronic attacker 118*a* may include a processor, a memory, and a transceiver configured to generate one or more communication signals. In one or more embodiments, the electronic attacker 118*a* is a new device in a predetermined area in which the server 102 and/or the user devices 106 are located. In some embodiments, radio waves, electromagnetic (EM) signaling, and/or communication operations 108 from the electronic attacker 118*a* are monitored over time in the network 110 to be evaluated in combination with one or more aforementioned operations.

In one or more embodiments, the electronic attacker 118*a* may be a person, people, or an automated electric component that use the attacks 122*a* to hack communications and operations of a specific user device 106 and/or the server 102. As a result of the attacks 122*a*, the electronic attacker 118*a* may control communications or operations of one or more of the hacked user devices 106. In this regard, the electronic attacker 118*a* may modify, cancel, or generate communications or operations in the hacked user devices 106. The electronic attacker 118*a* may pretend to perform one or more operations on behalf of one or more of the user devices 106.

Security Operations to Dynamically Analyze Feedback Data

FIG. 2 shows multiple security operations 200 in which the system 100 of FIG. 1 is configured to dynamically analyze feedback data 104, in accordance with one or more embodiments. In FIG. 2, the security operations 200 comprise multiple operations in the communication network. The security operations 200 may be performed between the server 102 and one or more electronic devices to determine whether certain entities are associated with one of more of the user devices 106 or one or more of the electronic attackers 118. The security operations 200 comprise multiple integration data captures 202-206 from the one or more server I/O interfaces 126, one or more device interfaces 182, and one or more interface data repositories 210, one or more feedback data collection operations 212, one or more analysis operations 220, one or more matching operations 222, and one or more differentiation operations 224 performed by the server 102. In some embodiments, one or more data transfers 240 may transmit collected feedback data 104 to the analysis operations 220, one or more data transfers 242 may transmit analyzed versions of the feedback data 104 from the analysis operations 220 to the one or more matching operations 222, one or more data transfers 244 from the matching operations 222 to the differentiation operations 224, and one or more data transfers 246 from the differentiation operations 224 to the feedback data collection operations 212. In some embodiments, the feedback data collection operations 212, the analysis operations 220, the matching operations 222, and the differentiation operations 224 may be configured to provide training reports to one or more interaction models 168*a*. Further, the ML algorithm may be executed in accordance with the interaction models 168*a* to perform the feedback data collection operations 212, the analysis operations 220, the matching operations 222, and the differentiation operations 224.

In one or more embodiments, the server I/O interfaces 126, the device interfaces 182, and/or one or more interface data repositories 210 may be configured to provide one or more captures 202-206, respectively. The captures 202-206 may comprise image data, text data, and/or audio data. The feedback data collection operations 212 may be configured to receive the captures 202-206, structure feedback data 104 in the captures 202-26, determine individual datapoints 134 in the feedback data 104, and perform one or more cataloguing operations where individual categorization formats 140 are associated with each of the datapoints 134. In transfers 240, the results of the feedback data collection operations 212 may be provided and/or transfer from the feedback data collection operations 212 to the one or more analysis operations 220.

At the one or more analysis operations 220, the server 102 may be configured to perform the one or more probabilistic linkage operations 139, the one or more aggregation operations 138, the one or more record linking operations 150, and/or the one or more data linking operations 152. The analysis operations 220 may be performed in parallel with one or more supervised ML training operations 230. The supervised ML training operations 230 may be one or more training operations 137 configured to monitor, rack, and/or observe inputs and results from the multiple analysis operations 220 to train one or more additional models 168 over time. In transfers 242, the server 102 is configured to transmit and/or provide the results of the analysis operations 220 to the one or more matching operations 222.

The matching operations may comprise one or more weighting operations 223 where weighted values 144 are assigned to one or more datapoints 134 in received feedback data 104 based on one or more corresponding categorization formats 140 and in accordance with one or more rules and policies 172. In transfers 244, the server 102 may be configured to provide and/or transmit results of the matching operations 222 to the one or more differentiation operations 224. At the differentiation operations 224, the server 102 may be configured to consider one or more of the training operations 137 and perform the one or more weight adjustment operations 154 to modify any of the weighted values generated in the matching operations 222. In transfer 246, the results of the differentiation operations 224 may be configured to provide and/or transfer any results back to the feedback collection operations 212 to use the evaluated feedback data 104 as new entries in the reference interaction data 156.

In one or more embodiments, the one or more models 168 may comprise one or more interaction models **168*a* configured to evaluate all outputs generated by the multiple operations in FIG. 2. The interaction models 168** may be configured to inform ML operations in a current system operation based on previous system operations.

In one or more embodiments, the weight values 144 may be assigned based at least in part upon corresponding categorization formats 140 and/or one or more data types 142. The weighting operations 223 may be configured to generate field weight estimates (based on the corresponding categorization formats 140) for the one or more datapoints 134. In some embodiments, certain fields may be assigned a higher weighted value than other fields. For example, a field representative of credentials associated with a user profile **162*a* may be assigned a higher weighted value 144*a*** than a field representative of light exposure in an image of a user face.

In one or more embodiments, training sets may be generated as part of the one or more training operations 137. The server 102 may be configured to generate the training sets based on current analysis and operations performed in the system 100. In some embodiments, the weighted values 144 may be configured to use one or more training set to train the one or more models 168.

In one or more embodiments, the server 102 may be configured to provide true probabilistic linkage of the datapoints 134 rather than solely deterministic linkage operations.

Example Process to Dynamically Analyze Feedback Data

FIG. 3 illustrates an example flowchart of a process 300 configured to dynamically analyze feedback data 104, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the user devices 106, or components of any of thereof performing operations described in operations 302-342 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer-readable medium such as server memory 130 of FIG. 1) that when run by one or more processors (e.g., the processor 128 of FIG. 1) may cause the one or more processors to perform operations described in operations 302-342.

The process 300 starts at operation 302, where the server 102 is configured to receive a communication operation **108*a* associated with an entity. At operation 304, the server 102 is configured to execute the ML algorithm 166 to determine feedback data 104 in the communication operation 108*a*. The feedback data 104 may comprise one or more datapoints 134** that represent information provided by the entity.

At operation 310, the server 102 is configured to determine whether there is feedback data 104 in the communication operation **108*a*. If the server 102 determines that the communication operation 108*a* does not comprise any feedback data 104 (e.g., NO), the process 300 proceeds to operation 332. If the server 102 determines that the communication operation 108*a* comprises any feedback data 104 (e.g., YES), the process 300 proceeds to operation 312**.

At operation 312, the server 102 is configured to determine categorization formats 136 associated with datapoints 134 in the feedback data 104. Each categorization format 136 may be associated with one or datapoints 134. At operation 314, the server 102 is configured to assign a specific weighted value 144 to each datapoint 134 based on respective categorization format 136. At operation 316, the server 102 is configured to compare the datapoints 134 to multiple reference datapoints 158 in reference interaction data 156. In some embodiments, the server 102 is configured to determine whether the datapoints 134 in the feedback data 104 at least partially match the reference datapoints 158 in reference interaction data 156. In other embodiments, the server 102 is configured to determine whether the datapoints 134 in the feedback data 104 at least partially do not match the reference datapoints 158 in reference interaction data 156. Herein, the server 102 may be configured to perform one or more of the aggregation operations 138, the probabilistic linkage operations 139, the record link operations 150, and the data linking operations 152 based on matches or mismatches found between the datapoints 134 in the feedback data 104 and the reference datapoints 158 in the reference interaction data 156.

At operation 318, the server 102 may be configured to determine multiple weighted values 144 for each of the datapoints 134 that match the reference datapoints 158. At operation 320, the server 102 is configured to aggregate the weighted values 144 into a match value **148*a*. The weighted values 144 may be assigned in accordance with one or more aggregation operations 138 that add up and/or compile values assigned to matches and/or non-matches between the datapoints 134 in the feedback data 104 and reference datapoints 158 in the reference interaction data 156**.

At operation 322, the server 102 is configured to determine whether the match value **148*a* is less than a predefined value threshold 146*a*. If the server 102 determine that the match value is not less than a predefined value threshold (e.g., NO), the process 300 proceeds to operation 332. If the server 102 determine that the match value is less than a predefined value threshold (e.g., YES), the process 300 proceeds to operation 342**.

The process 300 may end at operation 332, where the server 102 may be configured to determine that the entity is not associated with the one of user profiles 162. Herein, in response to determining that the match value **148*a* is less than the value threshold 146*a*, the server 102 is configured to determine that the entity is associated with the one or more user profiles 162**.

The process 300 may end at operation 342, where the server 102 may be configured to determine that the entity is associated with the one of user profiles 162. Herein, in response to determining that the match value **148*a* is less than the value threshold 146***a*, the server 102 is configured to determine that the entity is associated with the one or more user profiles 162.

In some embodiments, the server 102 may be configured to execute the ML algorithms 166 to perform one or more training operations 137 comprising generating one or more training commands (e.g., training sets) comprising the feedback data 104, the weighted values 144, and the value threshold 146*a*. The server 102 may be configured to train the one or more ML models 168 using the training commands. In some embodiments, results from the matches and/or mismatches may be used to perform the one or more training operations 137. Herein the analyzed feedback data 104 may be reclassified into reference interaction data 156.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words “means for” or “step for” are explicitly used in the particular claim.

The invention claimed is:

1. A system, comprising:
- a memory operable to store:
  - a machine learning algorithm configured, when executed, to evaluate data in accordance with one or more machine learning models; and
  - reference interaction data comprising a plurality of reference datapoints indicating user information associated with one or more user profiles; and
- at least one processor communicatively coupled to the memory and configured to:
  - receive a first communication operation associated with a first entity; and
  - execute the machine learning algorithm to:
    - determine first feedback data in the first communication operation, wherein the first communication operation comprises an interaction over a communication network and first feedback data is determined from that interaction as information provided by the first entity, the first feedback data comprising a first plurality of datapoints that represents information provided by the first entity;
    - in response to determining the first feedback data in the first communication operation, determine a first plurality of categorization formats associated with the first plurality of datapoints, each categorization format being associated with each datapoint;
    - assign a first specific weighted value to each datapoint of the first plurality of datapoints based on respective categorization formats;
    - compare the first plurality of datapoints to the plurality of reference datapoints in reference interaction data previously processed and determined to match user information associated with one or more user profiles;
    - perform one or more probabilistic linkage operations to connect one or more interactions in the communication network where the first entity is attempting to access multiple accounts and network resources associated with the one or more user profiles, wherein the one or more probabilistic linkage operations comprise correlating user information from feedback data relating to the one or more interactions and one or more activities associated with the one or more user profiles;
    - determine whether the first plurality of datapoints at least partially matches the plurality of reference datapoints;
    - determine a first plurality of weighted values for each of the first plurality of datapoints that match the plurality of reference datapoints;
    - aggregate the first plurality of weighted values into a first match value;
    - determine whether the first match value is less than a first value threshold, wherein the first value threshold comprises a lower boundary that, when the first match value is less than the first value threshold, triggers association of the first entity to the one or more user profiles in an authentication process; and
    - in response to determining that the first match value is less than the first value threshold, determine that the first entity is associated with the one or more user profiles.

2. The system of claim 1, wherein the at least one processor is further configured to:
- receive a second communication operation associated with a second entity; and
- execute the machine learning algorithm to:
  - determine second feedback data in the second communication operation, the second feedback data comprising a second plurality of datapoints that represents information provided by the second entity;
  - in response to determining the second feedback data in the second communication operation, determine a second plurality of categorization formats associated with the second plurality of datapoints;
  - assign a second specific weighted value to each datapoint of the second plurality of datapoints based on respective categorization formats;
  - compare the second plurality of datapoints to the plurality of reference datapoints;
  - determine whether the second plurality of datapoints at least partially matches the plurality of reference datapoints;

determine a second plurality of weighted values for each of the second plurality of datapoints that match the plurality of reference datapoints;

aggregate the second plurality of weighted values into a second match value;

determine whether the second match value is greater than a second value threshold; and in response to determining that the second match value is greater than the second value threshold, determine that the second entity is not associated with the one or more user profiles.

3. The system of claim 1, wherein the at least one processor is further configured to:

generate training operations comprising the first feedback data, the first plurality of weighted values, and the first value threshold; and train the one or more machine learning models using the training operations.

4. The system of claim 1, wherein the at least one processor is further configured to:

receive a second communication operation associated with a second entity; and execute the machine learning algorithm to:

determine second feedback data in the second communication operation, the second feedback data comprising a second plurality of datapoints that represents information provided by the second entity;

in response to determining the second feedback data in the second communication operation, determine a second plurality of categorization formats associated with the second plurality of datapoints;

assign a second specific weighted value to each datapoint of the second plurality of datapoints based on respective categorization formats;

compare the second plurality of datapoints to the plurality of reference datapoints;

determine whether the second plurality of datapoints are at least partially different from the plurality of reference datapoints;

determine a second plurality of weighted values for each of the second plurality of datapoints that are different from the plurality of reference datapoints;

aggregate the second plurality of weighted values into a mismatch value;

determine whether the mismatch value is less than a second value threshold; and in response to determining that the mismatch value is less than the second value threshold, determine that the second entity is associated with the one or more user profiles.

5. The system of claim 1, wherein the at least one processor is further configured to:

receive a second communication operation associated with a second entity; and execute the machine learning algorithm to:

determine second feedback data in the second communication operation, the second feedback data comprising a second plurality of datapoints that represents information provided by the second entity;

in response to determining the second feedback data in the second communication operation, determine a second plurality of categorization formats associated with the second plurality of datapoints;

assign a second specific weighted value to each datapoint of the second plurality of datapoints based on respective categorization formats;

compare the second plurality of datapoints to the plurality of reference datapoints;

determine whether the second plurality of datapoints are at least partially different from the plurality of reference datapoints;

determine a second plurality of weighted values for each of the second plurality of datapoints that are different from the plurality of reference datapoints;

aggregate the second plurality of weighted values into a mismatch value;

determine whether the mismatch value is greater than a second value threshold; and in response to determining that the mismatch value is greater than the second value threshold, determine that the second entity is not associated with the one or more user profiles.

6. The system of claim 1, wherein:

the reference interaction data is updated dynamically over time.

7. The system of claim 1, wherein:

the reference interaction data is updated periodically over time.

8. A method, comprising:

receiving a first communication operation associated with a first entity; and executing a machine learning algorithm to perform one or more operations comprising:

determining first feedback data in the first communication operation, wherein the first communication operation comprises an interaction over a communication network and first feedback data is determined from that interaction as information provided by the first entity, the first feedback data comprising a first plurality of datapoints that represents information provided by the first entity;

in response to determining the first feedback data in the first communication operation, determining a first plurality of categorization formats associated with the first plurality of datapoints, each communication parameter being associated with each datapoint;

assigning a first specific weighted value to each datapoint of the first plurality of datapoints based on respective categorization formats;

comparing the first plurality of datapoints to a plurality of reference datapoints indicating user information associated with one or more user profiles, wherein the plurality of reference datapoints are in reference interaction data previously processed and determined to match user information associated with one or more user profiles;

performing one or more probabilistic linkage operations to connect one or more interactions in the communication network where the first entity is attempting to access multiple accounts and network resources associated with the one or more user profiles, wherein the one or more probabilistic linkage operations comprise correlating user information from feedback data relating to the one or more interactions and one or more activities associated with the one or more user profiles;

determining whether the first plurality of datapoints at least partially matches the plurality of reference datapoints;

determining a first plurality of weighted values for each of the first plurality of datapoints that match the plurality of reference datapoints;

aggregating the first plurality of weighted values into a first match value;

determining whether the first match value is less than a first value threshold, wherein the first value threshold comprises a lower boundary that, when the first match value is less than the first value threshold, triggers association of the first entity to the one or more user profiles in an authentication process; and in response to determining that the first match value is less than the first value threshold, determining that the first entity is associated with the one or more user profiles.

9. The method of claim 8, further comprising:

receiving a second communication operation associated with a second entity; and executing the machine learning algorithm to perform one or more additional operations comprising:

determining second feedback data in the second communication operation, the second feedback data comprising a second plurality of datapoints that represents information provided by the second entity;

in response to determining the second feedback data in the second communication operation, determining a second plurality of categorization formats associated with the second plurality of datapoints;

assigning a second specific weighted value to each datapoint of the second plurality of datapoints based on respective categorization formats;

comparing the second plurality of datapoints to the plurality of reference datapoints;

determining whether the second plurality of datapoints at least partially matches the plurality of reference datapoints;

determining a second plurality of weighted values for each of the second plurality of datapoints that match the plurality of reference datapoints;

aggregating the second plurality of weighted values into a second match value;

determining whether the second match value is greater than a second value threshold; and in response to determining that the second match value is greater than the second value threshold, determining that the second entity is not associated with the one or more user profiles.

10. The method of claim 8, further comprising:

generating training operations comprising the first feedback data, the first plurality of weighted values, and the first value threshold; and training one or more machine learning models using the training operations.

11. The method of claim 8, further comprising:

receiving a second communication operation associated with a second entity; and executing the machine learning algorithm to perform one or more additional operations comprising:

determining second feedback data in the second communication operation, the second feedback data comprising a second plurality of datapoints that represents information provided by the second entity;

in response to determining the second feedback data in the second communication operation, determining a second plurality of categorization formats associated with the second plurality of datapoints;

assigning a second specific weighted value to each datapoint of the second plurality of datapoints based on respective categorization formats;

comparing the second plurality of datapoints to the plurality of reference datapoints;

determining whether the second plurality of datapoints are at least partially different from the plurality of reference datapoints;

determining a second plurality of weighted values for each of the second plurality of datapoints that are different from the plurality of reference datapoints;

aggregating the second plurality of weighted values into a mismatch value;

determining whether the mismatch value is less than a second value threshold; and in response to determining that the mismatch value is less than the second value threshold, determining that the second entity is associated with the one or more user profiles.

12. The method of claim 8, further comprising:

receiving a second communication operation associated with a second entity; and executing the machine learning algorithm to perform one or more additional operation comprising:

determining second feedback data in the second communication operation, the second feedback data comprising a second plurality of datapoints that represents information provided by the second entity;

in response to determining the second feedback data in the second communication operation, determining a second plurality of categorization formats associated with the second plurality of datapoints;

assigning a second specific weighted value to each datapoint of the second plurality of datapoints based on respective categorization formats;

comparing the second plurality of datapoints to the plurality of reference datapoints;

determining whether the second plurality of datapoints are at least partially different from the plurality of reference datapoints;

determining a second plurality of weighted values for each of the second plurality of datapoints that are different from the plurality of reference datapoints;

aggregating the second plurality of weighted values into a mismatch value;

determining whether the mismatch value is greater than a second value threshold; and in response to determining that the mismatch value is greater than the second value threshold, determining that the second entity is not associated with the one or more user profiles.

13. The method of claim 8, wherein:

the plurality of reference datapoints is updated dynamically over time.

14. The method of claim 12, wherein:

the plurality of reference datapoints is updated periodically over time.

15. A non-transitory computer-readable medium storing instructions that when executed by a processor cause the processor to:

receive a first communication operation associated with a first entity; and execute a machine learning algorithm to:

determine first feedback data in the first communication operation, wherein the first communication operation comprises an interaction over a communication network and first feedback data is determined from that interaction as information provided by the first entity, the first feedback data comprising a first plurality of datapoints that represents information provided by the first entity;

in response to determining the first feedback data in the first communication operation, determine a first plurality of categorization formats associated with the first plurality of datapoints, each communication parameter being associated with each datapoint;

assign a first specific weighted value to each datapoint of the first plurality of datapoints based on respective categorization formats;

compare the first plurality of datapoints to a plurality of reference datapoints indicating user information associated with one or more user profiles, wherein the plurality of reference datapoints are in reference interaction data previously processed and determined to match user information associated with one or more user profiles;

perform one or more probabilistic linkage operations to connect one or more interactions in the communication network where the first entity is attempting to access multiple accounts and network resources associated with the one or more user profiles, wherein the one or more probabilistic linkage operations comprise correlating user information from feedback data relating to the one or more interactions and one or more activities associated with the one or more user profiles;

determine whether the first plurality of datapoints at least partially matches the plurality of reference datapoints;

determine a first plurality of weighted values for each of the first plurality of datapoints that match the plurality of reference datapoints;

aggregate the first plurality of weighted values into a first match value;

determine whether the first match value is less than a first value threshold, wherein the first value threshold comprises a lower boundary that, when the first match value is less than the first value threshold, triggers association of the first entity to the one or more user profiles in an authentication process; and in response to determining that the first match value is less than the first value threshold, determine that the first entity is associated with the one or more user profiles.

16. The non-transitory computer-readable medium of claim 15, wherein, when executed by the processor, the instructions further cause the processor to:

receive a second communication operation associated with a second entity; and execute the machine learning algorithm to:

determine second feedback data in the second communication operation, the second feedback data comprising a second plurality of datapoints that represents information provided by the second entity;

in response to determining the second feedback data in the second communication operation, determine a second plurality of categorization formats associated with the second plurality of datapoints;

assign a second specific weighted value to each datapoint of the second plurality of datapoints based on respective categorization formats;

compare the second plurality of datapoints to the plurality of reference datapoints;

determine whether the second plurality of datapoints at least partially matches the plurality of reference datapoints;

determine a second plurality of weighted values for each of the second plurality of datapoints that match the plurality of reference datapoints;

aggregate the second plurality of weighted values into a second match value;

determine whether the second match value is greater than a second value threshold; and in response to determining that the second match value is greater than the second value threshold, determine that the second entity is not associated with the one or more user profiles.

17. The non-transitory computer-readable medium of claim 15, wherein, when executed by the processor, the instructions further cause the processor to:

generate training operations comprising the first feedback data, the first plurality of weighted values, and the first value threshold; and train one or more machine learning models using the training operations.

18. The non-transitory computer-readable medium of claim 15, wherein, when executed by the processor, the instructions further cause the processor to:

receive a second communication operation associated with a second entity; and execute the machine learning algorithm to:

determine second feedback data in the second communication operation, the second feedback data comprising a second plurality of datapoints that represents information provided by the second entity;

in response to determining the second feedback data in the second communication operation, determine a second plurality of categorization formats associated with the second plurality of datapoints;

assign a second specific weighted value to each datapoint of the second plurality of datapoints based on respective categorization formats;

compare the second plurality of datapoints to the plurality of reference datapoints;

determine whether the second plurality of datapoints are at least partially different from the plurality of reference datapoints;

determine a second plurality of weighted values for each of the second plurality of datapoints that are different from the plurality of reference datapoints;

aggregate the second plurality of weighted values into a mismatch value;

determine whether the mismatch value is less than a second value threshold; and in response to determining that the mismatch value is less than the second value threshold, determine that the second entity is associated with the one or more user profiles.

19. The non-transitory computer-readable medium of claim 15, wherein, when executed by the processor, the instructions further cause the processor to:

receive a second communication operation associated with a second entity; and execute the machine learning algorithm to:

determine second feedback data in the second communication operation, the second feedback data comprising a second plurality of datapoints that represents information provided by the second entity;

in response to determining the second feedback data in the second communication operation, determine a second plurality of categorization formats associated with the second plurality of datapoints;

assign a second specific weighted value to each datapoint of the second plurality of datapoints based on respective categorization formats;

compare the second plurality of datapoints to the plurality of reference datapoints;

determine whether the second plurality of datapoints are at least partially different from the plurality of reference datapoints;

determine a second plurality of weighted values for each of the second plurality of datapoints that are different from the plurality of reference datapoints;

aggregate the second plurality of weighted values into a mismatch value;

determine whether the mismatch value is greater than a second value threshold; and in response to determining that the mismatch value is greater than the second value threshold, determine that the second entity is not associated with the one or more user profiles.

20. The non-transitory computer-readable medium of claim 15, wherein:

the plurality of reference datapoints is updated dynamically over time.

* * * * *